US007840975B2

(12) United States Patent
Matheny et al.

(10) Patent No.: US 7,840,975 B2
(45) Date of Patent: Nov. 23, 2010

(54) SYSTEM AND METHOD FOR ENCOURAGING VIEWERS TO WATCH TELEVISION PROGRAMS

(75) Inventors: John R. Matheny, San Francisco, CA (US); Daniel J. Zigmond, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 923 days.

(21) Appl. No.: 10/835,196

(22) Filed: Apr. 29, 2004

(65) Prior Publication Data

US 2004/0205810 A1 Oct. 14, 2004

Related U.S. Application Data

(63) Continuation of application No. 09/566,695, filed on May 8, 2000, now Pat. No. 6,766,524.

(51) Int. Cl.
*H04N 7/16* (2006.01)
*H04N 7/10* (2006.01)
*H04N 7/025* (2006.01)

(52) U.S. Cl. .............................. 725/23; 725/32; 725/36

(58) Field of Classification Search ................... 725/23
See application file for complete search history.

(56) References Cited

U.S. PATENT DOCUMENTS

| 4,894,789 A | 1/1990 | Yee |
| 5,010,499 A | 4/1991 | Yee |
| 5,091,877 A | 2/1992 | Itoh |
| 5,121,476 A | 6/1992 | Yee |
| 5,355,484 A | 10/1994 | Record |
| 5,473,673 A * | 12/1995 | Van Wijk et al. ......... 379/92.01 |
| 5,485,553 A | 1/1996 | Kovalick |

(Continued)

FOREIGN PATENT DOCUMENTS

EP 0849946 6/1998

(Continued)

OTHER PUBLICATIONS

U.S. Appl. No. 10/133,554, filed Apr. 26, 2002, Zigmond.

(Continued)

*Primary Examiner*—Joseph P Hirl
*Assistant Examiner*—Mushfikh Alam
(74) *Attorney, Agent, or Firm*—Workman Nydegger

(57) ABSTRACT

Described are methods and apparatus for encouraging viewers to pay attention to television programs, commercials in particular, by offering viewers some incentive to watch. In one embodiment, viewers are notified that they can receive frequent-flier miles for answering one or more simple questions at the conclusion of the commercial. To verify that the viewer paid attention to the commercial, the answer to the question may be based on the content of the commercial. A sponsor might ask, for example, that the viewer identify the name of the sponsor or the color of an announcer's shirt. A correct answer indicates that the viewer watched the commercial, and that the viewer is therefore entitled to some reward. For example, viewers who watch the commercial may be entered in a prize drawing, or may receive prize points, such as frequent-flier miles. In other embodiments, viewers may verify that they watched a given program by selecting an icon or pressing a button on a remote control.

20 Claims, 4 Drawing Sheets

U.S. PATENT DOCUMENTS

| | | | |
|---|---|---|---|
| 5,488,409 A * | 1/1996 | Yuen et al. ................ 725/41 |
| 5,508,731 A | 4/1996 | Kohorn |
| 5,526,035 A | 6/1996 | Lappington |
| 5,528,490 A | 6/1996 | Hill |
| 5,539,822 A | 7/1996 | Lett |
| 5,589,892 A | 12/1996 | Knee |
| 5,600,632 A | 2/1997 | Schulman |
| 5,617,526 A | 4/1997 | Oran |
| 5,648,824 A | 7/1997 | Dunn |
| 5,737,552 A | 4/1998 | Lavallee |
| 5,752,159 A | 5/1998 | Faust |
| 5,761,602 A | 6/1998 | Wagner |
| 5,761,606 A | 6/1998 | Wolzien |
| 5,771,354 A | 6/1998 | Crawford |
| 5,774,664 A | 6/1998 | Hidary |
| 5,774,666 A | 6/1998 | Portuesi |
| 5,778,181 A | 7/1998 | Hidary |
| 5,796,967 A | 8/1998 | Filepp |
| 5,798,785 A | 8/1998 | Hendricks |
| 5,801,747 A | 9/1998 | Bedard |
| 5,818,441 A | 10/1998 | Throckmorton |
| 5,818,935 A | 10/1998 | Maa |
| 5,826,165 A | 10/1998 | Echeita |
| 5,832,223 A | 11/1998 | Hara |
| 5,835,712 A | 11/1998 | DuFresne |
| 5,838,314 A * | 11/1998 | Neel et al. ................ 725/8 |
| 5,844,620 A | 12/1998 | Coleman |
| 5,845,260 A * | 12/1998 | Nakano et al. ............ 705/26 |
| 5,848,352 A | 12/1998 | Dougherty |
| 5,848,396 A | 12/1998 | Gerace |
| 5,848,397 A | 12/1998 | Marsh |
| 5,855,008 A | 12/1998 | Goldhaber |
| 5,857,190 A | 1/1999 | Brown |
| 5,861,881 A | 1/1999 | Freeman |
| 5,862,220 A | 1/1999 | Perlman |
| 5,864,823 A | 1/1999 | Levitan |
| 5,867,208 A | 2/1999 | McLaren |
| 5,889,950 A | 3/1999 | Kuzma |
| 5,929,849 A | 7/1999 | Kikinis |
| 5,929,850 A | 7/1999 | Broadwin |
| 5,931,908 A | 8/1999 | Gerba |
| 5,937,331 A | 8/1999 | Kalluri |
| 5,956,090 A | 9/1999 | Yamauchi |
| 5,961,603 A | 10/1999 | Kunkel |
| 5,978,828 A | 11/1999 | Greer |
| 5,982,445 A | 11/1999 | Eyer |
| 5,987,509 A | 11/1999 | Portuesi |
| 5,991,596 A | 11/1999 | Cunningham |
| 5,991,799 A | 11/1999 | Yen |
| 6,002,394 A | 12/1999 | Schein |
| 6,002,444 A | 12/1999 | Marshall |
| 6,005,565 A | 12/1999 | Legall |
| 6,006,256 A | 12/1999 | Zdepski |
| 6,006,265 A | 12/1999 | Rangan |
| 6,008,836 A | 12/1999 | Bruke |
| 6,009,410 A | 12/1999 | LeMole |
| 6,011,537 A | 1/2000 | Slotznick |
| 6,012,087 A | 1/2000 | Freivald |
| 6,018,764 A | 1/2000 | Field |
| 6,018,768 A | 1/2000 | Ullman |
| 6,021,426 A | 2/2000 | Douglis |
| 6,023,698 A | 2/2000 | Lavey |
| 6,025,837 A | 2/2000 | Mathews |
| 6,026,435 A | 2/2000 | Enomoto |
| 6,029,045 A * | 2/2000 | Picco et al. ................ 725/34 |
| 6,029,193 A | 2/2000 | Yamamoto |
| 6,034,689 A | 3/2000 | White |
| 6,049,831 A | 4/2000 | Gardell |
| 6,055,564 A | 4/2000 | Phaal |
| 6,057,872 A * | 5/2000 | Candelore ................ 725/23 |
| 6,058,430 A | 5/2000 | Kaplan |
| 6,061,719 A | 5/2000 | Bendinelli |
| 6,064,376 A | 5/2000 | Berezowski |
| 6,064,440 A | 5/2000 | Born |
| 6,075,568 A | 6/2000 | Matsuura |
| 6,078,961 A | 6/2000 | Mourad |
| 6,081,842 A | 6/2000 | Shachar |
| 6,097,441 A | 8/2000 | Allport |
| 6,134,379 A | 10/2000 | LaMacchia |
| 6,141,678 A | 10/2000 | Britt |
| 6,154,771 A | 11/2000 | Rangan |
| 6,169,541 B1 | 1/2001 | Smith |
| 6,172,673 B1 | 1/2001 | Lehtinen |
| 6,172,677 B1 | 1/2001 | Stautner |
| 6,177,931 B1 | 1/2001 | Alexander |
| 6,178,114 B1 | 1/2001 | Yang |
| 6,195,692 B1 | 2/2001 | Hsu |
| 6,198,511 B1 | 3/2001 | Matz |
| 6,199,206 B1 | 3/2001 | Nishioka |
| 6,201,538 B1 | 3/2001 | Wugofski |
| 6,215,483 B1 | 4/2001 | Zigmond |
| 6,229,532 B1 | 5/2001 | Fujii |
| 6,229,541 B1 | 5/2001 | Kamen |
| 6,240,555 B1 | 5/2001 | Shoff |
| 6,243,741 B1 | 6/2001 | Utsumi |
| 6,253,204 B1 | 6/2001 | Glass |
| 6,253,228 B1 | 6/2001 | Ferris |
| 6,256,785 B1 | 7/2001 | Klappert |
| 6,260,192 B1 | 7/2001 | Rosin |
| 6,263,505 B1 | 7/2001 | Walker |
| 6,268,849 B1 | 7/2001 | Boyer |
| 6,285,407 B1 | 9/2001 | Yasuki |
| 6,314,569 B1 | 11/2001 | Chernock |
| 6,317,780 B1 | 11/2001 | Cohn |
| 6,317,885 B1 | 11/2001 | Fries |
| 6,335,736 B1 | 1/2002 | Wagner |
| 6,348,932 B1 | 2/2002 | Nishikawa |
| 6,351,270 B1 | 2/2002 | Nishikawa |
| 6,357,042 B2 | 3/2002 | Srinivasan |
| 6,367,080 B1 | 4/2002 | Enomoto |
| 6,373,503 B1 | 4/2002 | Perkes |
| 6,374,404 B1 | 4/2002 | Brotz |
| 6,400,407 B1 | 6/2002 | Zigmond |
| 6,412,111 B1 | 6/2002 | Cato |
| 6,415,319 B1 | 7/2002 | Ambroziak |
| 6,415,438 B1 | 7/2002 | Blacketter |
| 6,446,261 B1 | 9/2002 | Rosser |
| 6,460,180 B1 | 10/2002 | Park |
| 6,473,903 B2 | 10/2002 | Balakrishnan |
| 6,502,243 B1 | 12/2002 | Thomas |
| 6,510,557 B1 | 1/2003 | Thrift |
| 6,510,558 B1 | 1/2003 | Linuma |
| 6,512,551 B1 | 1/2003 | Lund |
| 6,522,342 B1 | 2/2003 | Gagnon |
| 6,530,082 B1 | 3/2003 | Del Sesto |
| 6,560,777 B2 | 5/2003 | Blacketter |
| 6,564,379 B1 | 5/2003 | Knudson |
| 6,571,392 B1 | 5/2003 | Zigmond et al. |
| 6,584,153 B1 | 6/2003 | Comito |
| 6,600,496 B1 | 7/2003 | Wagner |
| 6,604,239 B1 * | 8/2003 | Kohen ................ 705/36 R |
| 6,604,242 B1 | 8/2003 | Weinstein |
| 6,615,408 B1 | 9/2003 | Kaiser |
| 6,662,007 B2 | 12/2003 | Yuen |
| 6,668,378 B2 | 12/2003 | Leak |
| 6,681,393 B1 | 1/2004 | Bauminger |
| 6,698,020 B1 | 2/2004 | Zigmond |
| 6,725,461 B1 | 4/2004 | Dougherty |
| 6,751,800 B1 | 6/2004 | Fukuda |
| 6,754,905 B2 | 6/2004 | Gordon |
| 6,785,902 B1 | 8/2004 | Zigmond |
| 6,886,178 B1 | 4/2005 | Mao |
| 6,912,726 B1 | 6/2005 | Chen |
| 6,928,652 B1 | 8/2005 | Goldman |

| | | |
|---|---|---|
| 6,938,270 B2 | 8/2005 | Blacketter |
| 6,990,676 B1 | 1/2006 | Proehl |
| 6,990,678 B2 | 1/2006 | Zigmond |
| 7,103,904 B1 | 9/2006 | Blacketter |
| 7,165,266 B2 | 1/2007 | Zigmond |
| 7,174,562 B1 | 2/2007 | Leak |
| 7,181,756 B1 | 2/2007 | Zigmond |
| 7,296,282 B1* | 11/2007 | Koplar et al. ............... 725/23 |
| 2001/0001160 A1 | 5/2001 | Shoff |
| 2002/0007493 A1 | 1/2002 | Butler |
| 2002/0010926 A1 | 1/2002 | Lee |
| 2002/0053077 A1* | 5/2002 | Shah-Nazaroff et al. ...... 725/13 |
| 2002/0092017 A1* | 7/2002 | Klosterman et al. ........... 725/35 |
| 2002/0133816 A1 | 9/2002 | Greene |
| 2003/0005463 A1 | 1/2003 | Macrae |
| 2004/0040042 A1* | 2/2004 | Feinleib ..................... 725/112 |
| 2004/0237119 A1* | 11/2004 | Smith et al. ................. 725/133 |
| 2004/0261130 A1 | 12/2004 | Leak |
| 2005/0028206 A1 | 2/2005 | Cameron |
| 2005/0044571 A1 | 2/2005 | Goldman |
| 2005/0097594 A1* | 5/2005 | O'Donnell et al. ............ 725/15 |
| 2005/0172331 A1* | 8/2005 | Blackketter et al. ........ 725/135 |
| 2006/0015893 A1* | 1/2006 | Kitsukawa et al. ............ 725/23 |
| 2007/0107030 A1 | 5/2007 | Zigmond |

FOREIGN PATENT DOCUMENTS

| | | |
|---|---|---|
| EP | 0942595 | 9/1999 |
| GB | 2338364 | 12/1999 |
| WO | 97-22207 | 6/1997 |
| WO | 98-17064 | 4/1998 |
| WO | 98-41020 | 9/1998 |
| WO | 98-53611 | 11/1998 |
| WO | 01-01270 | 1/2001 |

OTHER PUBLICATIONS

Electronic Industries Association EIA-746A, "Transport of Internet Uniform Resource Locator (URL) Information using Text-2 (T-2) Service" (Sep. 1998).
"Uniform Resource Locators for Television Broadcasts," D. Zigmond, (Jun. 1997).
"Uniform Resource Locators for Television and Telephony," D. Zigmond (Oct. 1996).
Advanced Television Enhancement Forum Specification (ATVEF), Version 1.1 revision 26, (Feb. 2, 1999).
R. Panabaker, S. Wegerif, and D. Zigmond, "The Transmission of IP Over the Vertical Blanking Interval of a Television Signal," (Feb. 1999).
"Creating Interactive Television Links," http://developer.webtv.net/itv/links/main.htm (Jun. 9, 1999).
"Displaying Television Broadcasts in Web Pages," http://developer.erbtv.net/itv/embedtv.main.htm (Jun. 9, 1999).
Electronic Industries Association EIA-608, "Recommended Practice for Line 21 Data Service" (Sep. 1994).
Request for Comments (RFC) 791, "Internet Protocol, DARPA Internet Protocol Specification," Sep. 1981.
Bryant, Stewart Dr., "The Liberate Technologies TV Navigator for DTV: A Think Web-Centric Client For Digital Television".
Electronic Industries Association EIA—516, "Joint EIA/CVCC Recommended Practice for Teletext: North American Basic Teletext Specification (NABTS)", 89 pages (May 1988).
Advanced Television Enhancement Forum Specification (ATVEF), comment draft Version 1.0, Revision 1, 19 pages (Aug. 1998).
Advanced Television Enhancement Forum Specification (ATVEF), Draft Version 1.1, Revision 19, 32 Pages (Aug. 1998).
Prestion Galla, "How The Internet Works", Special Edition, pp. 66, 67, 142, 143, 150, 151,260, 261, 278, 279 (1997).
Intel Intercast Website, "How Does It Work", Pages from www.intercast.com, 8 pages (Jan. 29, 1999).
J. Daniel Gifford, "Teletext Decoder", Radio-Electronics, Apr. 1996, pp. 45-49.
S. Deering, "Host Extensions for IP Multicasting" (Aug. 1989).
J. Postel, "User Datagram Protocol," (Aug. 1980), identified as page "ftp://ftp.isi.edu/in-notes/rfc768.txt".
ECMA—European Association for Standardizing Information and Communication systems, "Standard ECMA—262, 2nd Edition" (Aug. 1998).
W3C, "Document Object Model (DOM) Level 1 Specification" (Oct. 1998), Identified as page, http://www.w3.org/TR/1998/REC-DOM-Level-1-19981001/DOM.txt.
W3c, "HTML 4.0 Specification," Chapters 1-18 (Apr. 1998), Identified as page, http://www.w3.org/TR/REC-html40/.
"Netcentives Launches Global Incentive Program," Netcentives Press (download Oct. 25, 1999) Identified as pages "http://www.netcentives.com/press/archive/NC19991021a.html".
"ClickReward™, It all adds up," Netcentives Press (Download Oct. 25, 1999) Identified as page "http.www.netcentives.com/clickrewards/index.html".
Michael B Jones, "The Microsoft Interactive TV System: An Experience Report", pp. 17 (Jul. 1997).
Office Action dated Mar. 29, 2004 cited in Patent No. 7,174,562.
Office Action dated Jul. 8, 2004 cited in Patent No. 7,174,562.
Office Action dated Apr. 20, 2005 cited in Patent No. 7,174,562.
Office Action dated Aug. 12, 2005 cited in Patent No. 7,174,562.
Office Action dated Jan. 31, 2006 cited in Patent No. 7,174,562.
Office Action dated Jul. 3, 2006 cited in Patent No. 7,174,562.
Notice of Allowance dated Oct. 10, 2006 cited in Patent No. 7,174,562.
Office Action dated Dec. 13, 2007 cited in U.S. Appl. No. 10/893,518.
Office Action dated Jun. 19, 2008 cited in U.S. Appl. No. 10/893,518.
Office Action dated Dec. 19, 2002 cited in U.S. Appl. No. 09/345,247.
Notice of Allowance dated Jun. 4, 2003 cited in U.S. Appl. No. 09/345,247.
Office Action dated Jul. 5, 2002 cited in U.S. Appl. No. 09/295,436.
Notice of Allowance dated Jan. 15, 2003 cited in U.S. Appl. No. 09/295,436.
Office Action dated Dec. 6, 2000 cited in U.S. Appl. No. 09/295,746.
Office Action dated Jul. 18, 2001 cited in U.S. Appl. No. 09/295,746.
Notice of Allowanced dated May 21, 2002 cited in U.S. Appl. No. 09/295,746.
Office Action dated May 9, 2001 cited in U.S. Appl. No. 09/087,354.
Office Action dated Jan. 31, 2002 cited in U.S. Appl. No. 09/087,354.
Office Action dated Dec. 17, 2002 cited in U.S. Appl. No. 09/087,354.
Office Action dated Jun. 19, 2003 cited in U.S. Appl. No. 09/087,354.
Office Action dated Dec. 8, 2003 cited in U.S. Appl. No. 09/087,354.
Office Action dated May 5, 2004 cited in U.S. Appl. No. 09/087,354.
Notice of Allowance dated Jul. 13, 2004 cited in U.S. Appl. No. 09/087,354.
Supplemental Notice of Allowability dated Mar. 10, 2005 cited in U.S. Appl. No. 09/087,354.
Office Action dated Apr. 12, 2000 cited in U.S. Appl. No. 09/099,481.
Notice of Allowance dated Sep. 11, 2000 cited in U.S. Appl. No. 09/099,481.
Supplemental Notice of Allowability dated Nov. 9, 2000 cited in U.S. Appl. No. 09/099,481.
Office Action dated Feb. 13, 2004 cited in U.S. Appl. No. 09/788,985.
Office Action dated Nov. 17, 2004 cited in U.S. Appl. No. 09/788,985.
Notice of Allowance dated Jun. 17, 2005 cited in U.S. Appl. No. 09/788,985.
Notice of Allowance dated Oct. 31, 2006 cited in U.S. Appl. No. 11/216,250.
Office Action dated May 9, 2003 cited in U.S. Appl. No. 09/345,223.
Office Action dated Nov. 21, 2003 cited in U.S. Appl. No. 09/345,223.
Office Action dated Jun. 3, 2004 cited in U.S. Appl. No. 09/345,223.
Office Action dated Oct. 20, 2005 cited in U.S. Appl. No. 09/345,223.
Notice of Allowance dated Jun. 14, 2006 cited in U.S. Appl. No. 09/345,223.
Office Action dated Aug. 14, 2002 cited in U.S. Appl. No. 09/287,985.
Office Action dated Apr. 21, 2003 cited in U.S. Appl. No. 09/287,985.

Office Action dated Sep. 25, 2003 cited in U.S. Appl. No. 09/287,985.
Office Action dated Mar. 29, 2004 cited in U.S. Appl. No. 09/287,985.
Notice of Allowance dated Mar. 2, 2005 cited in U.S. Appl. No. 09/287,985.
Office Action dated Apr. 10, 2003 cited in U.S. Appl. No. 09/566,695.
Notice of Allowance dated Mar. 1, 2004 cited in U.S. Appl. No. 09/566,695.
Office Action dated Oct. 27, 2003 cited in U.S. Appl. No. 09/566,695.
Notice of Allowance dated Jan. 8, 2009 cited in U.S. Appl. No. 10/893,518.
Office Action dated Dec. 30, 2008 cited in U.S. Appl. No. 11/614,759.
Office Action dated Nov. 22, 2000 cited in U.S. Appl. No. 09/412,839.
Office Action dated Jul. 18, 2001 cited in U.S. Appl. No. 09/412,839.
Notice of Allowance dated Feb. 25, 2002 cited in U.S. Appl. No. 09/412,839.
Office Action dated Oct. 16, 2007 cited in U.S. Appl. No. 10/918,864.
Office Action dated May 13, 2008 cited in U.S. Appl. No. 10/918,864.
Office Action dated Jan. 21, 2009 cited in U.S. Appl. No. 10/918,864.
"WebTV Networks Introduces It's Revolutionary Next-Generation System-Web TV Plus", on Network Computing News, Sep. 16, 1997, Downloaded from www.ncns.com Jul. 3, 2008.
"WebTV Plus.. Is it Worth an Upgrade?" by Dexter Davenport on Net4tv, Apr. 1, 1998, Downloaded form www.net-4tv.com, Jul. 3, 2008.
Office Action dated Aug. 5, 2008 cited in U.S. Appl. No. 11/093,666.
Office Action dated Feb. 4, 2009 cited in U.S. Appl. No. 11/093,666.
Notice of Allowance dated Apr. 30, 2009 cited in U.S. Appl. No. 10/893,518.
Office Action dated Jul. 21, 2009 cited in U.S. Appl. No. 11/093,666.
Office Action dated Aug. 5, 2009 cited in U.S. Appl. No. 11/614,759.
Notice of Allowance dated Dec. 31, 2009 cited in U.S. Appl. No. 11/614,759.
Office Action dated Jan. 20, 2010 cited in U.S. Appl. No. 11/093,666.
Office Action dated Feb. 17, 2010 cited in U.S. Appl. No. 10/918,864.

* cited by examiner

SYSTEM AND METHOD FOR ENCOURAGING VIEWERS TO WATCH TELEVISION PROGRAMS

CROSS-REFERENCE TO RELATED APPLICATIONS

This application is a continuation of U.S. application Ser. No. 09/566,695, filed May 8, 2000 now U.S. Pat. No. 6,766,524, entitled "System and Method for Encouraging Viewers to Watch Television Programs," which is incorporated herein by reference.

BACKGROUND OF THE INVENTION

1. The Field of the Invention

The invention relates generally to supplementing broadcast television programming with interactive content.

2. The Relevant Technology

The Internet is a worldwide collection of networks and gateways. The Internet includes a backbone of high-speed communication lines between major nodes, consisting of thousands of commercial, government, educational, and other computer systems. The World Wide Web (the Web) is a collection of formatted hypertext pages—located on numerous computer systems around the world—that are logically connected by the Internet.

Web browsers provide user interfaces to the Web, allowing individuals to access Internet content from personal computers. Internet terminals, such as those pioneered by WebTV Networks, Inc., have made the Web more accessible by eliminating the need for a personal computer. Instead, Internet terminals, or "set-top boxes," provide Web access using an ordinary television (TV) set as a display and a remote control or wireless keyboard for user (e.g., viewer) input.

FIG. 1 illustrates a conventional interactive television system 100 that includes a broadcast source 105, a set-top box 110, an ordinary analog television set 115, and a remote control 117. Set-top box 110 and television set 115 collectively form a receiver, and may be integrated. Television set 115 displays video data, including a graphical user interface 116 and broadcast video 118, conveyed from set-top box 110 by a video link 120. Video link 120 is an RF (radio frequency), S-video, composite video, or other video link. Set-top box 110 includes a network connection 122 to the Internet. Connection 122 is typically accomplished using a telephone or cable modem.

Set-top box 110 includes hardware and software for receiving and decoding a broadcast video signal 125, and for providing video data to television set 115 via video link 120. Set-top box 110 also includes hardware and software for providing a viewer with graphical user interface 116, capable of displaying both broadcast video and Web content (e.g., HTML or XML pages). A viewer operates remote control 117 to control set-top box 110 to display broadcast TV, browse the Web, and send or receive e-mail. Viewers may also control set-top box 110 using a keyboard (not shown).

Commercial advertising supports the majority of broadcast television. Such advertising is not as effective as it might be, because viewers often use commercials as an opportunity to break from viewing their televisions or to flip to other channels. Advertisers are understandably troubled by either of these alternatives. To make matters worse, again from the perspective of advertisers, recent advances in recording technology have made it easier for viewers to avoid watching commercials. There is therefore a need for a means of encouraging viewers to watch commercials.

BRIEF SUMMARY OF THE INVENTION

The present invention encourages viewers to pay attention to TV programs (e.g., commercials) by offering viewers some incentive to watch. In one embodiment, viewers are notified that they can receive frequent-flier miles for answering one or more simple questions at the conclusion of the program. To verify that the viewer paid attention, the answer to the question may be based on the content of the program. A sponsor of a TV commercial might ask, for example, that the viewer identify the name of the sponsor or the color of an announcer's shirt. A correct answer indicates that the viewer watched the commercial, and that the viewer is therefore entitled to some reward. Possible rewards include entry into a prize drawing or points, such as frequent-flier miles, toward a prize. In other embodiments, viewers need not provide a "correct" answer, but may be rewarded for merely participating in the interactive program. Such participation may include selecting an icon with a pointing device, pressing one or more buttons on a remote control, or sending an email message to a location identified in the program.

Other features of the present invention will be apparent from the accompanying drawings and from the detailed description that follows.

DETAILED DESCRIPTION OF THE PREFERRED EMBODIMENTS

Figure 2:
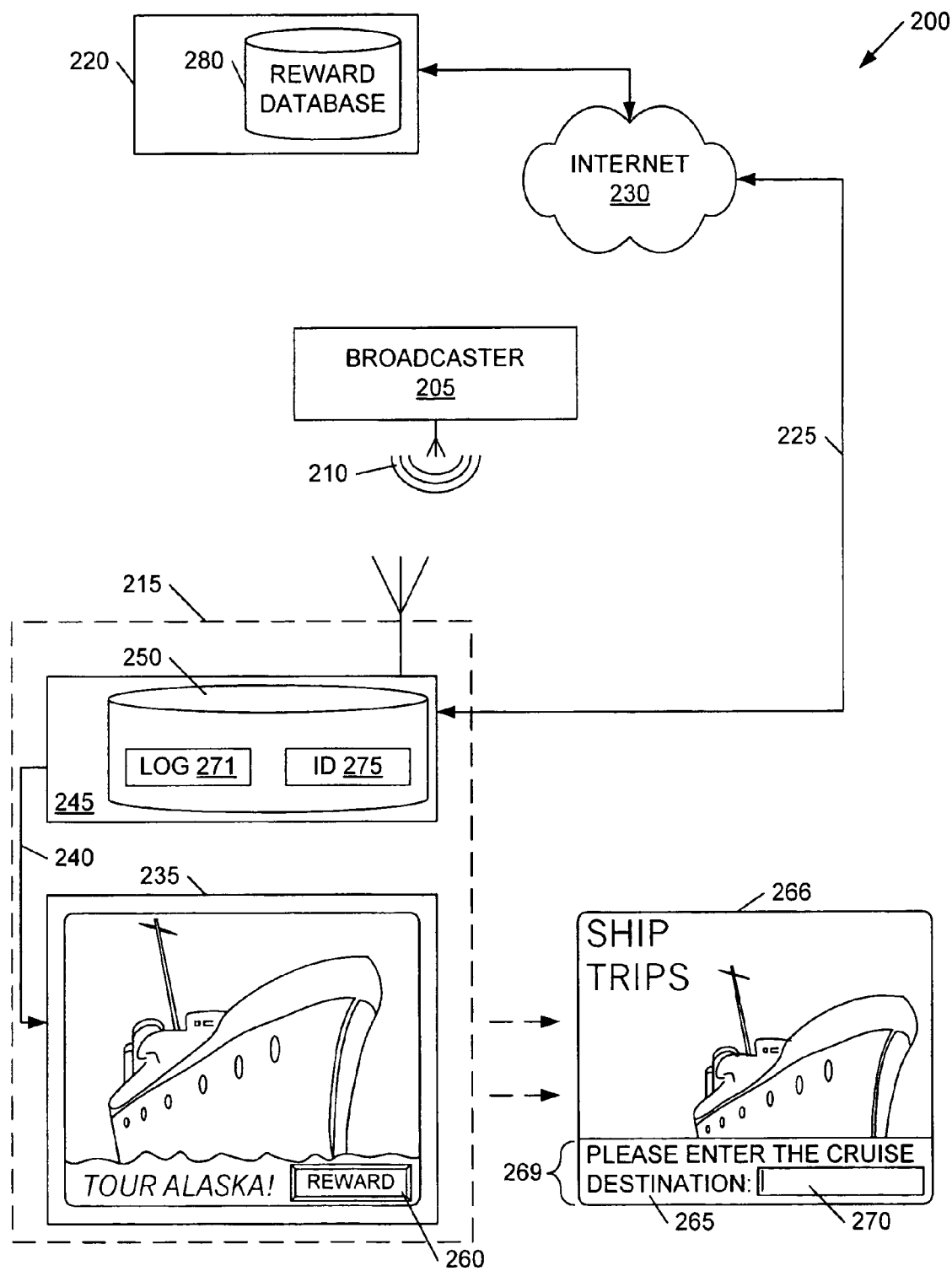
FIG. 2 illustrates a communication system 200 that enables television sponsors to reward viewers for paying attention to broadcast television commercials and other types of broadcast programs.

FIG. 2 illustrates a communication system 200 that enables television sponsors to reward viewers for paying attention to broadcast television commercials and other types of broadcast programs. System 200 includes a broadcaster 205 broadcasting a video signal 210 to a receiver 215. Receiver 215 is adapted to communicate with a remote server 220 via a bidirectional network connection 225 and the Internet 230. Internet 230 is understood to include all required modems, lines, and other components.

Figure 1:
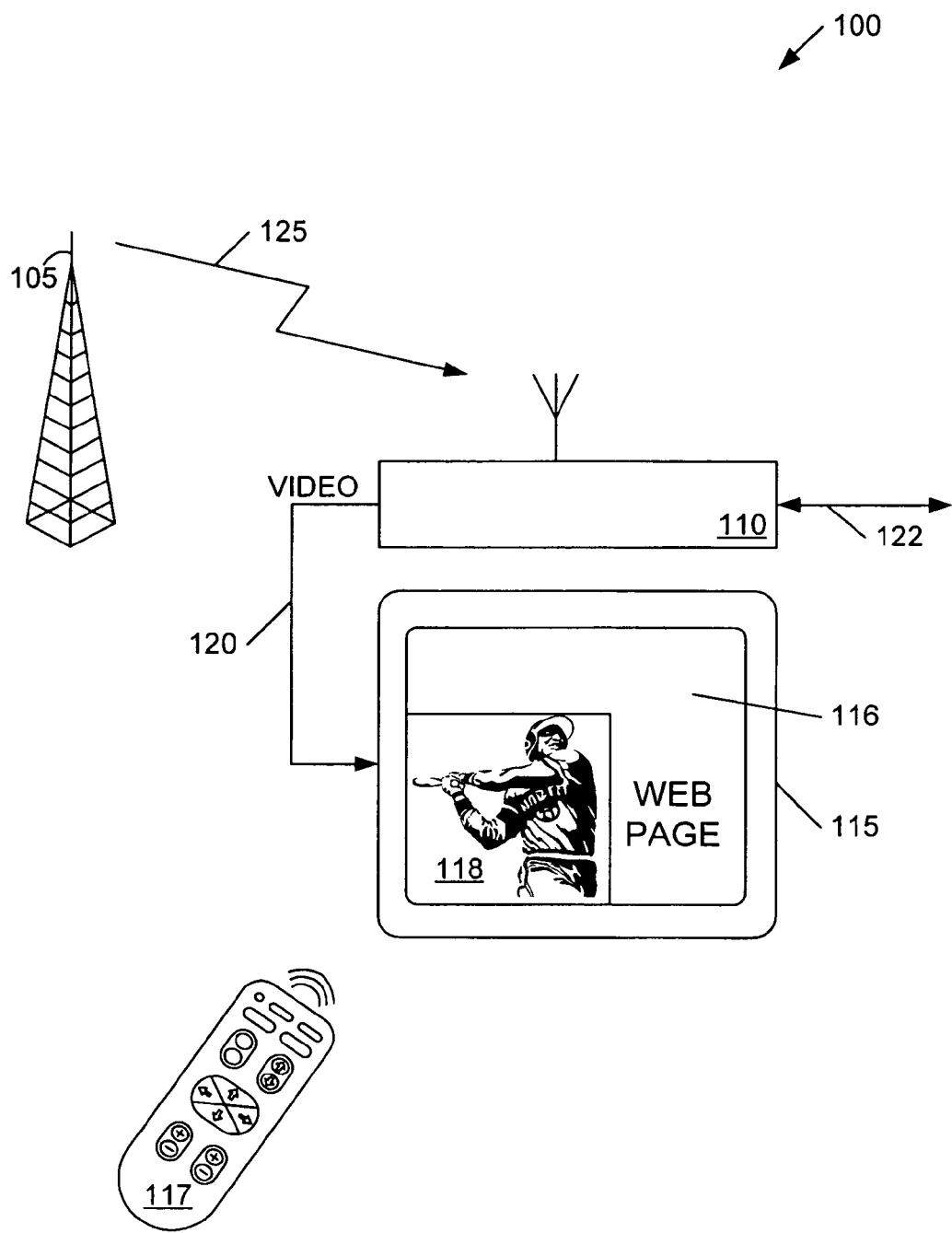
FIG. 1 (prior art) illustrates a conventional interactive television system 100.

Receiver 215 includes a television set 235 connected via a video line 240 to a set-top box 245 similar to set-top box 110 of FIG. 1. Television set 235 and set-top box 245 work together to display Web pages, broadcast television, or both. Web pages are typically downloaded over the Internet 230, but may also be received from video signal 210 or retrieved from a local memory, such as a disk drive 250 in set-top box 245. Set-top box 245 stores pages locally in each case.

In accordance with the invention, broadcaster 205 notifies viewers of television set 235 that they may be rewarded for paying attention to a current or upcoming program, typically a commercial. Later, viewers are presented a question, the answer to which is based upon the content of the program. Viewers that provide the correct answer are entitled to the reward. The identities of viewers who provide correct answers to the question are therefore forwarded to server 220, within which is maintained a database of viewers and corresponding earned entitlements.

For illustrative purposes, receiver 215 depicts a broadcast television commercial sponsored by a cruise line and advertising an Alaskan cruise. In accordance with the invention, television set 235 additionally displays a reward notice 260—in this case an interactive icon—alerting viewers of the possibility of receiving a reward for watching the depicted commercial. In one embodiment, viewers select reward notice 260 to participate in the interactive commercial.

In the example, the sponsoring cruise line is interested having viewers pay attention to the commercial, and is therefore willing to offer some incentive to viewers. For example, viewers who watch the commercial may be entered in a prize drawing, or may receive prize points, such as frequent-flier miles.

The possibility of receiving a reward will entice some viewers to claim rewards without bothering to watch the associated commercial. Thus, in accordance with one embodiment of the invention, viewers must provide some feedback to indicate that they watched the commercial before they are entitled to a reward. In the example of FIG. 2, set-top box 245 presents the viewer with a test question 265 at or near the end of the commercial.

The question is based upon the content of the commercial, so viewers who watch the commercial are able to answer the question correctly. In the example depicted as a subsequent video frame 266 of television 235, a reward query 265 prompts the viewer with a query 269 asking the viewer to enter the previously displayed cruise destination into a form field 270. Entering the correct answer in field 270 entitles a viewer to the offered reward.

Broadcasters may wish to pose questions for which there are no correct answers. For example, a sponsor may wish to ask survey questions. The invention may be adapted to provide rewards to viewers who answer such questions. Further, some viewers may find filling in blanks too cumbersome; thus, other embodiments employ simpler test methods (e.g., multiple-choice or true/false), or reward viewers for merely participating in interactive programs. Such participation may include selecting an icon with a pointing device or pressing one or more buttons on a remote control. Still other embodiments may demand more information from a viewer, such as by prompting the viewer to send an email message to a location identified in the program, and possibly by requiring the viewer fill out an electronic form.

Returning to the example of FIG. 2, if a viewer answers question 269, then set-top box 245 notes the identity of the program in which the question appeared, the time the question was posed, a value expressing how much of the program was viewed, and the viewer's answer to the query. Set-top box 245 then stores this information in a local log file 271 on disk drive 250. In other embodiments, set-top box 245 collects different types of information to identify whether viewers respond to selected programs when prompted.

The contents of log file 271 are eventually pushed to remote information store 220. In one embodiment, set-top box 245 periodically establishes network connection 225 to accomplish this push. Set-top box 245 includes a unique identifier 275, which set-top box 245 communicates to remote information store 220 each time a connection is established. In one embodiment, set-top box 245 automatically establishes connection 225 daily to retrieve updated programming information, and set-top box pushes the contents of log file 271 to information store 220 while connected. Information store 220 then uses identifier 275 to associate an earned reward or some other response with the registered user of set-top box 245. If set-top box 245 cannot communicate with remote information store 220, then set-top box 245 retains the information in log file 271 until communication is established or reestablished. Embodiments employing a constant network connection, such as via a cable network, may not require a log file.

Information store 220 includes a reward database 280 that includes a list of viewers and a corresponding list of reward points. In one embodiment, for example, viewers sign up to obtain frequent-flier miles for watching selected commercials. These viewers are listed in database 280. Earned rewards, such as frequent-flier miles, are then stored in a database field corresponding to the viewer.

The message that includes unique identifier 275 notifies information store 220 that the viewer associated with receiver 215 has answered a query, and may therefore be entitled to a reward. Information store 220 determines, based on the information identifying the program, whether the viewer provided the correct answer. If so, then information store 220 allocates the appropriate reward to the viewer.

In one embodiment, unique identifier 270 is the receiver serial number, and rewards are accumulated by the viewer registered as the owner of set-top box 245. In another embodiment, unique identifier 275 identifies the viewer, who would have been prompted for his or her identity before set-top box presents interactive advertising.

Reward notice 260 and reward query 275 are conveyed in trigger messages, or "triggers," broadcast to receivers of broadcast video. Such triggers generally instruct receivers to take a specific action to synchronize the content of a Web page with a broadcast television program. Reward notices and reward queries may be transmitted in the VBI of a broadcast video signal. The text service channels of line 21 of the VBI provide a robust communication medium, albeit at relatively low bandwidth. In some embodiments of the invention, reward notices and reward queries are text based, and their syntax follows a basic format that complies with the Electronic Industries Association EIA-746A, "Transport of Internet Uniform Resource Locator (URL) Information Using Text-2 (T-2) Service" (September 1998). EIA-746A defines the formatting necessary to transmit Internet URLs using the vertical blanking interval of a broadcast television signal, and is incorporated herein by reference. URLs are a conventional type of universal resource identifier, or "URI," which is a character string used to identify a resource, such as a file. Other types of URIs include local identifiers (LIDs), and universal resource names (URNs).

In one embodiment that complies with EIA-746A, each trigger conveying a reward notice (i.e., each "reward trigger") includes a URI that identifies a reward template stored in local memory in set-top box 245. In the example of FIG. 2, the reward template contains the data required to display and execute the icon of reward notice 260. Each trigger may include additional parameters, such as variables that define the length and identity of the program.

The following is an exemplary reward trigger for use in the embodiment of FIG. 2:

<lid://webtv.net/itv/templates/
reward.html?len=30&id=alaska21>[n:REWARD]
[1234]

The "lid" field includes a URI that identifies a reward template, and specifies a pair of parameters "len" and "id." The "len" parameter specifies the length of the program as 30 seconds, a typical length for a TV commercial. The "len" parameter tells set-top box 245 when to stop displaying reward notice 260. If the trigger were repeated every five seconds, for example, the next reward trigger would have a length attribute of 25. The "id" parameter includes a value that identifies the television program in question. In this hypothetical case, the string "id=alaska21" suggests that this is the Alaska Cruise ad #21. A name parameter "n" provides viewers with readable text. In the embodiment of FIG. 2, the name parameter is associated with the term "REWARD"; other text or symbols can also be used. The last field is an optional checksum that may be used to detect data corruption that may occur during receipt or transmission of a trigger. Preferably, a two byte hexadecimal checksum is employed such as a checksum that would be produced by the standard TCP/IP checksum algorithm described in Request For Comments (RFC) 791, "Internet Protocol, DARPA Internet Program Protocol Specification," September 1981, which is incorporated herein by reference.

Each "query trigger" conveying a reward query (e.g., reward query 265) includes a URI that identifies a query template stored in local memory in set-top box 245. In the example of FIG. 2, the query template contains the data required to display reward query 265. For additional information regarding templates for use with interactive television, see U.S. application Ser. No. 09/345,223 entitled "Methods and Apparatus for Broadcasting Interactive Advertising Using Remote Advertising Templates," by Blackketter et al., filed Jun. 30, 1999, which is incorporated herein by reference.

Each query trigger may include additional parameters, such as variables that convey the text of the query and that define the duration of the query. The following is an exemplary query trigger for use in the embodiment of FIG. 2:

<lid://webtv.net/itv/templates/
survey.html?len=20&id=alaska21?>[n:Please enter the cruise destination:][1234]

The foregoing trigger might bring up a standard "survey" enhancement that asks the viewer to answer the question presented in the name field "n." In other embodiments, the query might be used to rate the commercial or seek other types of information from viewers. As with the above-described reward trigger, the last field is a checksum.

Any trigger can be marked with an expiration date. This might be important if, for example, a commercial is rebroadcast after a reward is no longer available. In such a case, the trigger can include an expiration attribute that specifies a time after which set-top box 245 will no longer execute the trigger. For example, the above trigger can be set to expire on Dec. 31, 1999, by adding an expiration attribute as follows:

<lid://webtv.net/itv/templates/
reward.html?len=30&id=alaska21>[n:REWARD][e:19991231][1234]

Figure 3:
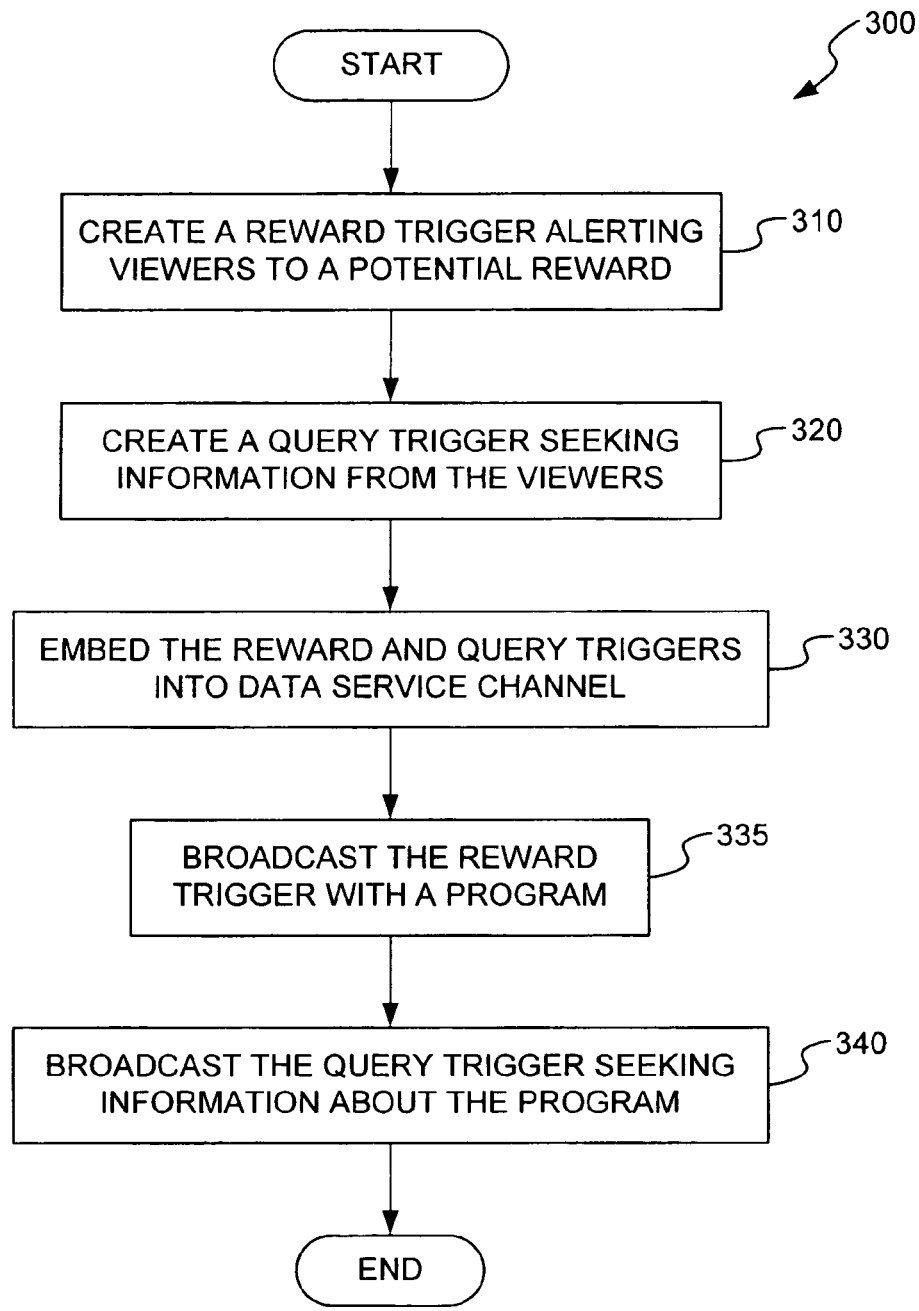
FIG. 3 is a flowchart 300 depicting a method employed by a content creator to encourage viewers to watch a program.

FIG. 3 is a flowchart 300 depicting a method employed by a content creator (e.g., a program producer, broadcaster, affiliate, cable company or satellite provider) to encourage viewers to watch a program. The content creator, typically an employee of a sponsor, first creates one or more reward triggers (step 310) using, for example, the syntax described above. The content creator also creates a query trigger seeking information from viewers that, if provided, will indicate that the viewer watched the program (step 320). The content creator then embeds the reward and query triggers into a data service channel of a video recording (step 330). For example, the reward and query triggers might be embedded into a data service channel of a recorded television program.

Because the reward trigger is meant to alert viewer of the subsequent test, the content creator typically embeds the reward trigger in the video program for display at a time before the query trigger. In other embodiments, a single trigger can be used to both alert viewers of an upcoming test and to administer the test. For example, the reward trigger could include a script that administers the test after a set period following selection of an icon associated with the reward trigger. For a description of how to incorporate scripts in triggers, see application Ser. No. 09/287,985, "Communicating Scripts in a Data Service Channel of a Video Signal," by Dean Blackketter and Daniel Zigmond, which is incorporated herein by reference.

Having prepared the program, including the triggers, the content creator delivers the program to a broadcaster. The broadcaster then broadcasts the program. Because the reward trigger precedes the query trigger in the program, broadcasting the program causes the reward trigger to be broadcast first (step 335). This typically occurs near the beginning of the program, allowing viewers time to respond. Early notice can be especially important for short programs, such as 15 or 30-second commercials. In one embodiment, reward triggers are sent every five seconds or so, so that viewers tuning in late to the corresponding program will have the opportunity to participate. Finally, after a time sufficient to allow viewers to respond to the reward trigger, the broadcaster broadcasts the query trigger to participating viewers (step 340).

In one embodiment, the broadcast video signal is a National Television Standards Committee (NTSC) video signal including a vertical blanking interval (VBI), and the data service channel is selected from a captioning service channel of a text service channel. The video signal may also be Phase Alternate Lines (PAL), Sequential Couleur Avec Memoire (SECAM), High Definition Television (HDTV), or a digital video signal such as a Digital Video Broadcasting (DVB) signal or an Advanced Television Systems Committee (ATSC) signal. Where the broadcast video signal is NTSC video signal, the triggers can be imbedded into line 21 of the vertical blanking interval (VBI). The protocols for broadcasting data in line 21 of the VBI call for relatively robust, low-speed communication. Higher bandwidth can be obtained using other lines of the VBI.

Reward and query triggers need not be provided to a broadcaster with a program. A content creator may embed one or more triggers into a video signal at each point along the video-signal distribution path. Thus, some markets may reward viewers for watching programs, while other markets may elect not to reward viewers for watching the same programs.

Figure 4:
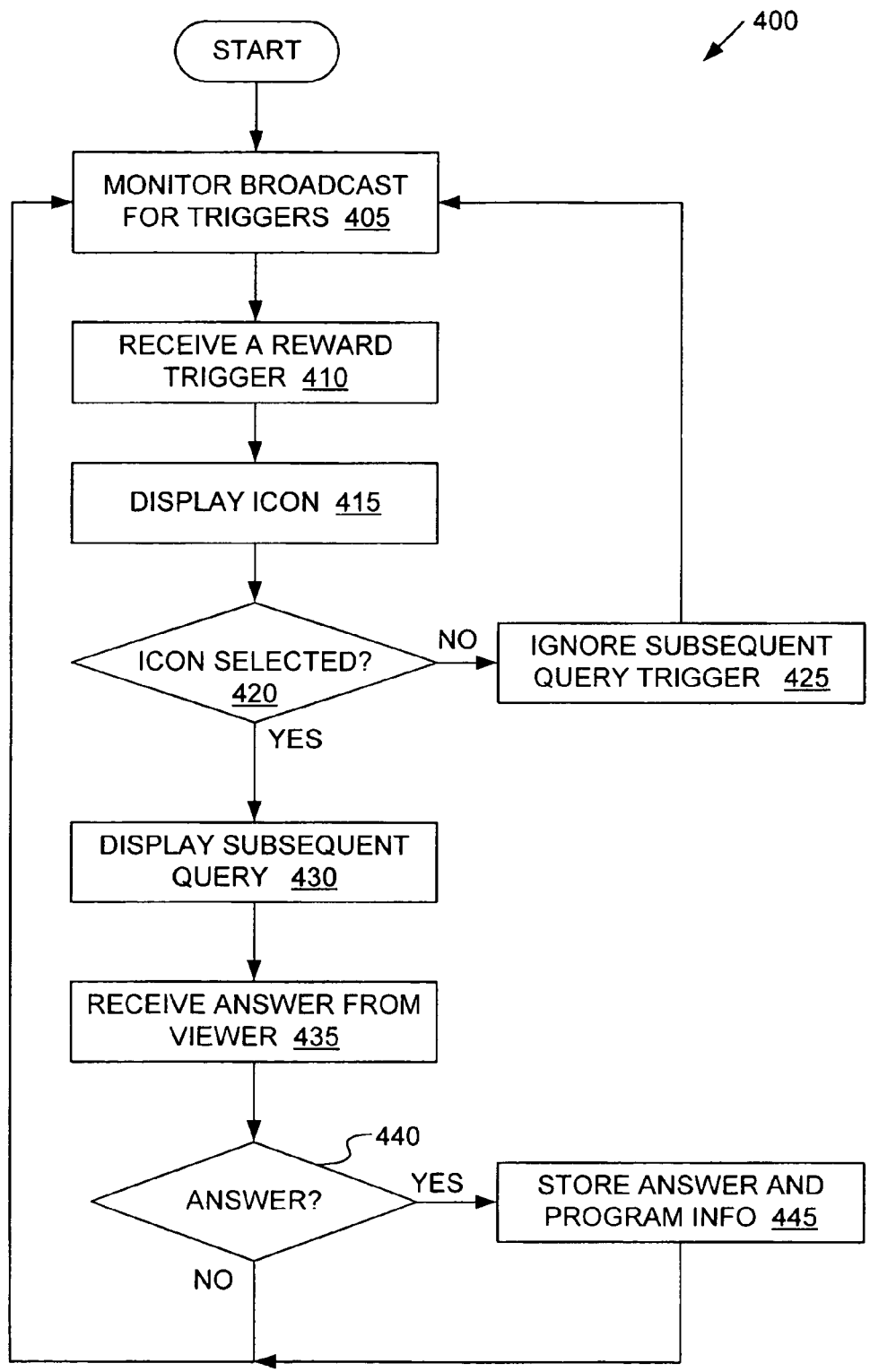
FIG. 4 is a flowchart 400 depicting a method performed by a receiver configured in accordance with the invention to respond to reward and query triggers.

FIG. 4 is a flowchart 400 depicting a method performed by a receiver configured in accordance with the invention to respond to reward and query triggers. The receiver begins by monitoring the broadcast signal for triggers, including reward and query triggers (step 405). Then, upon receipt of a reward trigger (step 410), the receiver displays some icon (step 415), or otherwise notifies viewers of the possibility of receiving a reward for interacting with the program. Incidentally, the term "viewer" is used here for convenience; the invention applies equally where the person receiving information is alerted by sound. Audio alerts are appropriate, for example, for the visually impaired.

The icon offers the viewer the choice of interacting with the program in an attempt to receive some reward. If the viewer does not select the icon (decision 420), then the receiver ignores the subsequent query trigger (step 425) and continues to monitor the broadcast signal. If, on the other hand, the viewer does select the icon (e.g., with a remote control), then the receiver executes the subsequent query trigger to display the associated query (step 430). As explained above in connection with FIG. 2, the query prompts the viewer to enter some information verifying that the viewer watched the program. If the viewer enters an answer (decision 440) before some period defined in the query trigger, then receiver 215 records the answer and other information relating to the timing and identify of the program (step 445). Later, typically when the receiver connects to receive programming information, the receiver will send this data to remote information store 220 (see FIG. 2).

Receiver 220 ignores unanswered reward queries, automatically removing them after a time specified in the query trigger.

In one embodiment, viewers are presented a reward query during or after a selected program without first being notified that they may be rewarded for watching the program. A sufficient number of random reward queries, or a sufficient reward, would encourage viewers to pay attention to commercials in the hope of exploiting the occasional reward query.

In one embodiment, reward database 280 receives and stores statistics of interest to sponsors in evaluating the effectiveness of their advertising. For example, one embodiment records the percentage of the program viewed, as indicated by the time between the viewer selecting reward notice 260 and the end of the commercial. In this embodiment, broadcaster 205 sends a trigger for reward notice 260 every five seconds until sending question 265. Subsequent triggers do not overwrite existing icons, and each trigger includes a time stamp. Thus, the time attribute of the selected reward notice 260 can be used to determine the point at which the viewer tuned into the commercial.

The foregoing broadcast and receive methods are embodied in machine-executable instructions, which can be used to cause a general-purpose or special-purpose processor programmed with the instructions to perform the steps. Alternatively, the steps might be performed by specific hardware components that contain hardwired logic for performing the steps, or by any combination of programmed computer components and dedicated hardware.

While the present invention has been described in connection with specific embodiments, variations of these embodiments will be apparent. For example, the queries could be loaded into receivers in advance of commercials, either via broadcast video or a network connection. Therefore, the spirit and scope of the appended claims should not be limited to the foregoing description.

What is claimed is:

1. At a television set-top box receiver that is configured to display video television programming that is broadcast from a broadcast signal source to one or more viewers and to receive, display and store web content encoded in the broadcast from the broadcast signal source, a method for offering reward incentives for the one or more viewers to watch video commercial programs broadcast during commercial breaks interrupting regularly scheduled programming, the method comprising:

at the set-top box receiver, and during a commercial break, receiving a broadcast signal from a broadcast signal source, the broadcast including a video commercial program that can be viewed by a viewer at a television connected to the set-top box receiver, wherein the broadcast signal includes a reward notice trigger and a query trigger, wherein the reward notice trigger is included in line 21 of a vertical blanking unit (VBI) as the video commercial program begins as well as at predetermined, specified intervals up through conclusion of the video commercial program, and wherein the query trigger is received in line 21 of the VBI of the broadcast signal of the video commercial program after initial receipt of the reward notice trigger, and prior to the conclusion of the video commercial program;

monitoring the broadcast for the reward notice trigger and the query trigger;

detecting the reward notice trigger as received in the broadcast signal of the video commercial program, the reward notice trigger storing a location and identity of a reward template stored locally on the set-top box receiver, a length of the video commercial program, in seconds, during which the reward notice trigger is to be displayed, an identification of the video commercial program, text for display to the viewer as notice that the reward notice trigger has been received, a checksum, and a date after which the set-top box should not display the reward notice trigger to the viewer;

upon detecting the reward notice trigger, generating an initial reward notice to alert the viewer of a reward for viewing the video commercial program, wherein the initial reward notice is associated with the reward notice trigger;

determining whether the date in the reward notice trigger has expired and, when it has not, displaying the generated initial reward notice to the user as an icon on the television connected to the set-top box receiver, the icon having a form as defined in the template identified in the reward notice trigger and including the text stored in the reward notice trigger, the icon being displayed during display of the video commercial program corresponding to the identification stored in the reward notice trigger;

detecting the query trigger as received in the broadcast signal of the video commercial program, the query trigger including a question field storing a question for the viewer to answer, wherein the question is about content of the video commercial program and for a correct answer to the question to be provided generally requires prior viewing of the video commercial program;

displaying the reward notice trigger and, upon receiving viewer selection of the reward notice trigger, generating a query interface for allowing the viewer to input an answer to the question in the question field of the query trigger; and transmitting the answer input by the viewer to a central server for a determination as to whether the viewer is entitled to a reward, entitlement to the reward being based at least in part on the central server determining that the viewer watched the video commercial program as a result of the user providing a correct answer to the question about the content of the video commercial program.

2. A method as recited in claim 1, wherein upon receiving a user selection of the reward notice, the method further includes displaying a solicitation for a user response verifying that the viewer watched the program.

3. A method as recited in claim 2, further including:
receiving a user response to the solicitation; and
sending the user response to a remote information store.

4. A method as recited in claim 2, wherein the solicited response comprises a request for information derived from the program.

5. A method as recited in claim 2, wherein the solicited response comprises an email from the one or more viewers.

6. A method as recited in claim 1, further comprising displaying the reward notice at a time closer to the beginning of a program than to the end of the program.

7. A computer program product comprising one or more computer-readable media having computer-executable instructions for implementing the method recited in claim 1.

8. A computer program product as recited in claim 7, wherein upon receiving a user selection of the reward notice, the method further includes displaying a solicitation for a user response verifying that the viewer watched the program.

9. A computer program product as recited in claim 8, further including:
   receiving a user response to the solicitation; and
   sending the user response to a remote information store.

10. A computer program product as recited in claim 8, wherein the solicited response comprises a request for information derived from the program.

11. In a broadcasting network that includes a broadcast signal source configured to broadcast video television programming to one or more television set-top box receivers that are configured to display the television video programming to one or more viewers and to receive, display and store web content encoded in the broadcast from the broadcast signal source, a method for offering reward incentives for the one or more viewers to watch video commercial programs broadcast during commercial breaks interrupting regularly scheduled programming, the method comprising:
   broadcasting a regularly scheduled television program to one or more television viewers via one or more television receivers;
   interrupting the regularly scheduled television program with a commercial break, and broadcasting a video commercial program during the commercial break, the video commercial program being broadcast for viewing by viewers at a television connected to a set-top box receiver, wherein the broadcast signal for the video commercial program includes a reward notice trigger and a query trigger, wherein the reward notice trigger is included in the vertical blanking unit (VBI) as the video commercial program begins as well as at predetermined, specific intervals up through conclusion of the video commercial program, and wherein the query trigger is configured for receipt in the VBI of the broadcast signal of the video commercial program after initial receipt of the reward notice trigger, and prior to the conclusion of the video commercial program;
   wherein the reward notice trigger is adapted to cause the set-top box to generate an initial reward notice and alert the viewers of a possibility of receiving a reward for viewing the video commercial program provided the viewer can correctly answer a question about the content of the video commercial program at the conclusion of the video commercial program, the reward notice being associated with the reward notice trigger, and being broadcast in the broadcast signal of the video commercial program and including a location and identity of a reward template stored locally on the set-top box receiver, a length of the commercial, in seconds, during which the reward notice trigger is to be displayed, an identification of the video commercial program in which the reward notice trigger is being broadcast, text for display to the viewer as notice that the reward notice trigger has been received by the set-top box receiver, a checksum, and an expiration date after which the set-top box should not display to the viewers the reward notice associated with the reward notice trigger;
   soliciting a response from the one or more the viewers, wherein the response is solicited only when the set-top box determines whether the date in the expiration field has not expired and, when it has not, displays the initial reward notice as an icon on the television, and according to a form defined in the template identified in the reward notice trigger, and which includes the text stored in the reward notice trigger, the icon being displayable during display of the video commercial program corresponding to the identification stored in the identification field, said response being solicited in the form of a query allowing the user to input an answer to a question in the query trigger, the question being about content of the video commercial program; and
   identifying a group of the viewers who viewed the program and that will be rewarded for viewing the program, wherein a determination that the viewers in the identified group viewed the program is at least partially based upon whether the one or more viewers submitted the response that included a correct answer to the question about the content of the video commercial program.

12. A method as recited in claim 11, further including:
   providing a reward to each viewer in the identified group of viewers.

13. A method as recited in claim 11, wherein the solicited response comprises a request for information derived from the television program.

14. A method as recited in claim 11, wherein the method further comprises displaying the reward notice at a time closer to the beginning of the program than to the end of the program.

15. A computer program product comprising one or more computer-readable media having computer-executable instructions for implementing the method recited in claim 11.

16. A computer program product as recited in claim 15, wherein the method further includes:
   providing a reward to each viewer in the identified group of viewers.

17. A computer program product as recited in claim 15, wherein the solicited response comprises a request for information derived from the television program.

18. A computer program product as recited in claim 15, wherein the method further comprises displaying the reward notice at a time closer to the beginning of the program than to the end of the program.

19. A method for rewarding customers for viewing video commercial programs interrupting regularly scheduled video programming displayed on a television display, the method comprising:
   receiving, at a set-top box receiver, a broadcast signal from a broadcast source, the broadcast signal including regularly scheduled television programming on a television channel;
   receiving, at the set-top box receiver, an interruption in the regularly scheduled television programming, the interruption corresponding to a commercial break on the television channel;
   during the commercial break, and on the television channel, receiving from the broadcast source a broadcast signal that includes a video commercial program;
   monitoring the broadcast signal of the video commercial program for a reward notice trigger;
   detecting the reward notice trigger at or near the beginning of the video commercial program, the reward notice trigger including a reference to a reward template for generating a reward notice to indicate to a viewer of the video commercial program an existence of a reward;
   evaluating the reference to the reward template and, in response, accessing the reward template and generating the reward notice on the television display;
   detecting receipt of a query trigger received in the broadcast signal of the video commercial program, the query trigger including a question about content of the video commercial program interrupting the regularly scheduled television programming, wherein a correct answer to the question generally requires the viewer have previously watched the video commercial program;

displaying the question about the content of the video commercial program and receiving an answer to the question from a viewer of the television display; and transmitting the answer input by the viewer to a central server for a determination as to whether the viewer watched the video commercial program, wherein the determination as to whether the viewer watched the video commercial program, and is thus entitled to a reward, is based on the viewer providing an answer that is correct about the content of the video commercial program.

20. A method as recited in claim 19, wherein detecting the reward notice trigger further comprises detecting that the reward notice trigger is repeated at specific intervals throughout a duration of the broadcast signal of the video commercial program.

* * * * *